United States Patent [19]
Garnett

[11] Patent Number: 4,802,558
[45] Date of Patent: Feb. 7, 1989

[54] APPARATUS PROVIDING ENVIRONMENTAL AND MECHANICAL PROTECTION FOR BALL SCREW DRIVES

[75] Inventor: Donald W. Garnett, Grand Ledge, Mich.

[73] Assignee: The Olofsson Corporation, Lansing, Mich.

[21] Appl. No.: 103,208

[22] Filed: Oct. 1, 1987

[51] Int. Cl.[4] .............................................. B60T 7/12
[52] U.S. Cl. ...................................... 188/134; 318/372
[58] Field of Search ....................... 188/134, 162, 180; 192/2, 8 R, 141, 144; 318/372

[56] References Cited
U.S. PATENT DOCUMENTS

| | | | |
|---|---|---|---|
| 4,202,430 | 5/1980 | Stevens | 188/162 X |
| 4,466,511 | 8/1984 | Garnett | 188/134 |
| 4,546,298 | 10/1985 | Wickham et al. | 188/162 X |

Primary Examiner—Duane A. Reger
Attorney, Agent, or Firm—Barnes, Kisselle, Raisch, Choate, Whittemore & Hulbert

[57] ABSTRACT

Apparatus for protecting the ball screw drive and other agencies involved in the operation of a movable slide of a machine tool from becoming contaminated by cutting fluids, mist, metal dust, chips, etc. An encasement provides a substantially closed chamber for the ball screw and nut. The apparatus also protects the drive from mechanical damage by stopping the rotational inertia of the ball screw when excessive resistance to motion is encountered.

14 Claims, 2 Drawing Sheets

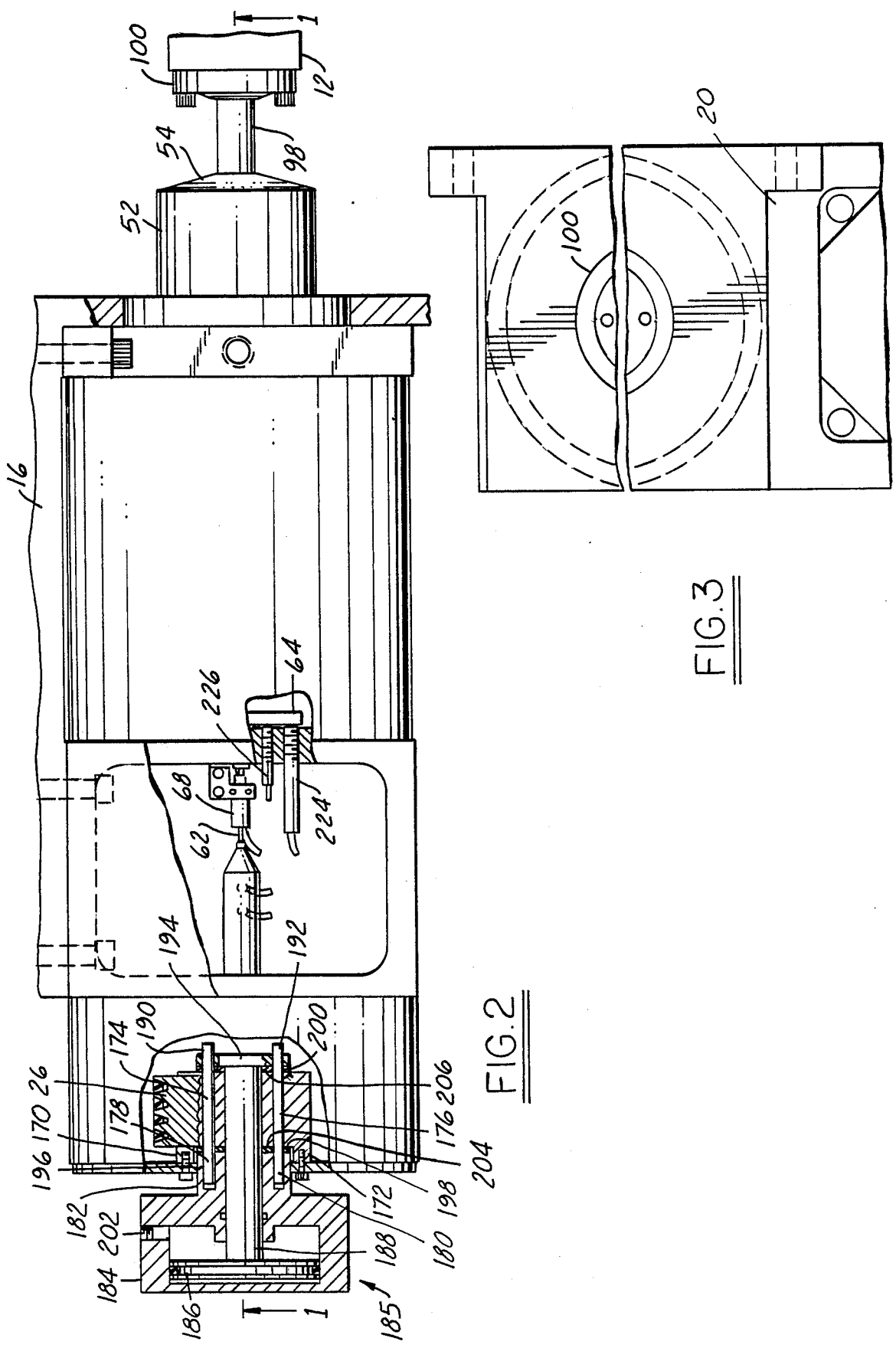

APPARATUS PROVIDING ENVIRONMENTAL AND MECHANICAL PROTECTION FOR BALL SCREW DRIVES

This invention relates to apparatus for providing all of the agencies needed to operate and precisely position machine slides, and to protect those agencies from hostile environments and mechanical damage.

SUMMARY OF THE INVENTION

Several prevalent problems exist in the use of numerically-controlled, servo-driven, ball screw drives for operating and positioning machine slides, especially in machine tool usage.

The contaminated environment of liquid and mist coolant along with metal dust and chips produced in machining operations tends to enter all devices, causing faulty operation and early failure.

In many ball screw driven machines, the ball nut is attached to a moving slide which is in the area contaminated by cutting fluids, mist, metal dust and chips. Attempts have been made to place the ball nut behind guards or telescoping guards, but these have not been completely impervious to penetration by contaminant.

Heat generated within the ball screw nut, support bearings, and motor cause metal expansion and thermal mispositioning.

In vertical applications of the drive, machine slide weight is sometimes compensated by the use of pneumatic counterbalance cylinders. However, space limitations often require that the counterbalance cylinder be located at a position other than above the center of gravity of the slide and displaced from the center of the driving ball screw, resulting in slide binding.

Minute misalignment of the ball screw drive with the machine slide motion causes slide binding and rapid wear.

Machine slide stops become contaminated causing faulty positioning.

An object of the invention is to provide a mechanism capable of solving the above listed problems.

This invention also provides means for stopping rotational inertia of the ball screw when excessive resistance to motion occurs, thus protecting against human error by the operator, machine malfunction, errors in programming of the machine moves, and electrical failures which cause mechanical abuse of the ball screw, ball screw support bearings and other agencies of the machine tool. As such, this invention is an improvement over the apparatus disclosed in my prior U.S. Pat. No. 4,466,511.

Other objects will become apparent as the following description proceeds, especially when considered with the accompanying drawings.

BRIEF DESCRIPTION OF THE DRAWINGS

FIG. 2 is a plan view partially in section.

FIG. 3 is a view in elevation from the machine member attachment end, with parts broken away, taken on the line 3—3 in FIG. 1.

DETAILED DESCRIPTION

Figure 1:
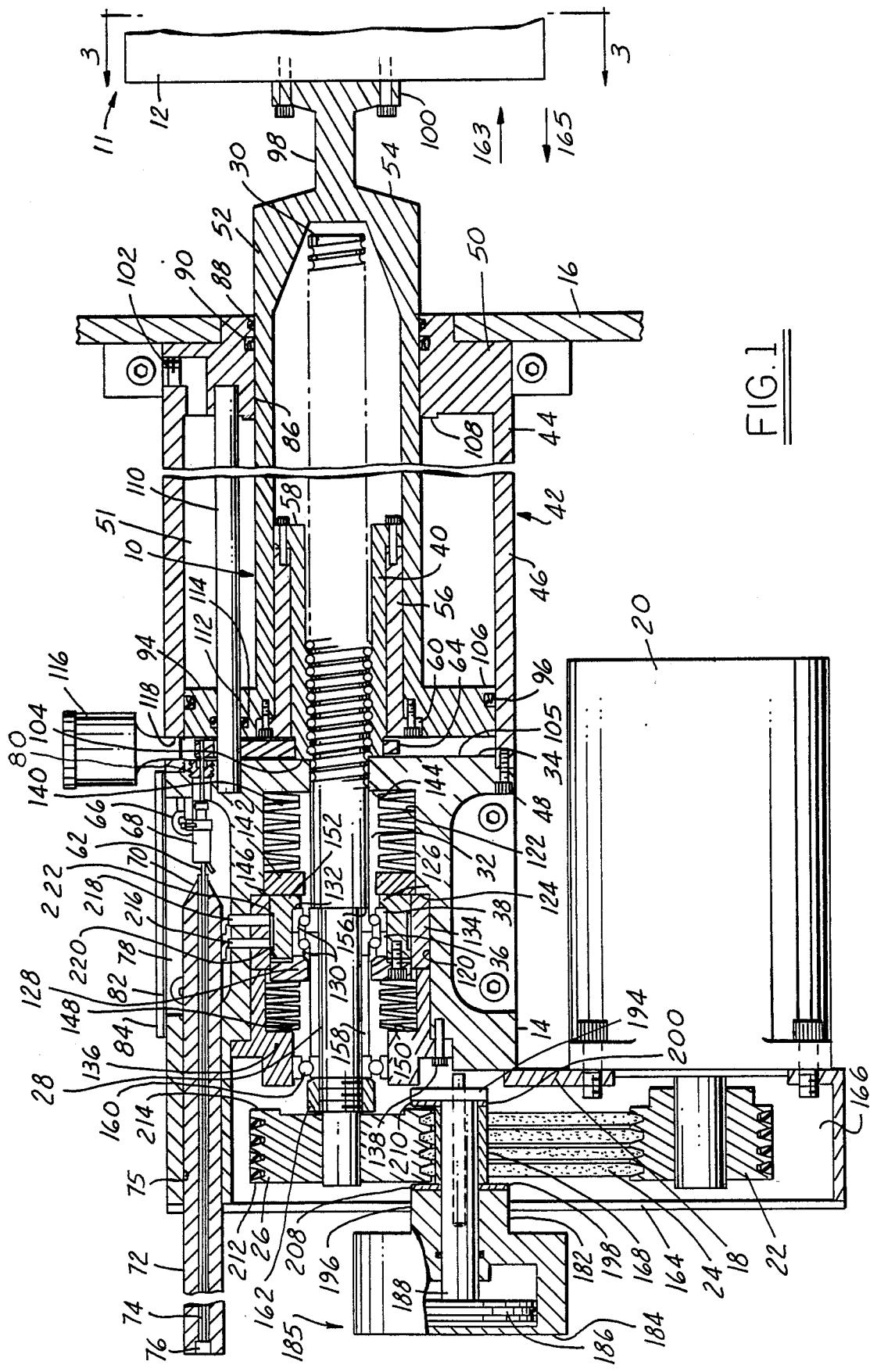
FIG. 1 is a sectional view in elevation taken on line 1—1 in FIG. 2 showing a ball screw drive attached to a movable machine member.

Referring now particularly to the drawings, a ball screw drive is generally indicated by number 10 and is mounted on a numerically-controlled servo driven machine tool 11 and attached to a movable machine slide or member 12 for reciprocal motion of the latter. A housing 14 is mounted on the machine 11 in spaced relation to machine frame 16 and provides a mounting for motor plate 18. Motor plate 18 mounts a servo motor 20. Motor 20 has a sheave 22 which, through belts 24, drives sheave 26. Sheave 26 is fixed in driving relationship on one end of ball screw 30.

One end portion 28 of ball screw 30 extends into a cavity 32 in the housing 14 through an opening in housing wall 34, and is supported for rotation and secured against axial shift by means including twin bearings 36 and 38 in the housing cavity 32 in a manner to be described later. A ball nut 40 is threaded on ball screw 30 outside the housing and is prevented from rotation by means to be described. Therefore, rotation of the ball screw 30 will cause ball nut 40 to translate axially.

The ball screw 30 extends beyond the housing 14 into the space between the housing 14 and frame 16. The portion of the ball screw outside the housing, and the ball nut, are protected from contaminants by an encasement 42, which includes a casing 44. The casing has a cylindrical wall 46 secured at one end to the housing wall 34 by bolts 48 in substantially air-tight relation. The opposite end of the cylindrical wall 46 is closed by an end wall 50. The casing 44 and housing wall 34 define a substantially closed chamber 51 for the ball screw 30, nut 40, and a tubular member 52 which will now be described.

The tubular member 52 is operably connected to ball nut 40 and extends lengthwise of the ball screw 30. Tubular member 52 has an inside diameter substantially greater than the diameter of the ball screw and loosely surrounds the portion of ball screw 30 outside housing 14 in concentric relation therewith. Tubular member 52 has a closed end 54 across the end of the ball screw. The tubular member 52 provides a substantially closed shroud for the portion of the ball screw drive outside the housing 14 and is part of the encasement for protecting the ball screw drive from contaminants. The tubular member 52 may be considered as a part or axial extension of nut 40.

The tubular member 52 is connected to ball nut 40 by a sleeve 56. Sleeve 56 surrounds ball nut 40 and has one end bolted to a flange 58 on the ball nut. The other end 60 of sleeve 56 is bolted to the tubular member. Sleeve 56 is made of a material, such as aluminum or magnesium, which has a relatively high coefficient of thermal expansion, whereas tubular member 52 is made of a material, such as steel or invar, having a substantially lower coefficient of thermal expansion. The ball nut 40, like the tubular member, also has a relatively low coefficient of thermal expansion. This is for purposes of temperature compensation as will be described later.

A linear encoded rod 62 is parallel to and laterally offset from ball screw 30. A part 64 mounted on ball nut 40 extends laterally outwardly from the ball nut and provides an attachment for rod 62, causing the rod to move with the ball nut. A bracket 66 attached to housing 14 mounts a stationary linear-encoded rod reader 68 which reads the machine position from the magnetic encoded pattern on the rod 62 and transmits such information to the numerical counters for the servo drive.

Encoded rod 62 extends through the reader 68 and enters the open end 70 of a support tube 72 which is lined with a plastic sheath 74 for guiding and supporting the rod. Support tube 72 is closely received in a passage, 75 in housing 14. A plug 76 closes off the outer end of support tube 72. The reader 68 is located in a cavity 78 in the housing 14. The open end of support tube 72 extends into the cavity 78. The encoded rod enters cavity 78 through a sealed opening in plug 80. A gasket 82 and cover 84 close the cavity 78.

The linear encoded rod 62 and reader 68 are thereby totally enclosed against external contamination.

Tubular member 52 on ball nut 40 extends through an opening which provides a gland bearing area 86 in the casing end wall 50. Gland area 86 is equipped with a dirt-excluder wiper 88 and a seal 90 which engage tubular member 52 to prevent the escape of compressed air in the casing chamber 51. The tubular member 52 has an integral piston 94 which slides on the cylindrical wall 46 of casing 44. Seal 96 on piston 94 engages wall 46 to prevent air flow past the piston. A neck extension 98 on the closed end of tubular member 52 is of reduced cross section and has a flange end 100 bolted to the movable machine member 12. The reduced cross section of extension 98 allows slight lateral flexing of flange end 100, while maintaining a rigid axial attachment to machine member 12.

A port 102 is located in the wall of casing 44 for introduction of compressed air to casing chamber 51.

The linear motion of the ball nut 40 and tubular member 52 is limited in one direction by end 104 of ball nut 40 contacting face 105 of wall 34 of the housing 14. Linear motion in the other direction is limited by face 106 of the piston 94 contacting an inner face 108 of the casing end wall 50. The faces 105 and 108 provide stops which are totally enclosed within the chamber 51 of casing 44 and are thus protected from external contamination.

An anti-rotation rod 110 is fitted at one end into housing 14, and is fitted at its opposite end into the end wall 50 of the casing 44. Anti-rotation rod 110 also slidably extends through a bearing hole 112 in the piston 94 of the tubular member 52. Bearing hole 112 is fitted with a seal 114 to prevent escape of compressed air. Anti-rotation rod 110 extends parallel with the axis of tubular member 52 and therefore prevents rotation of the tubular member 52 during its linear motion between stops.

Rotation of the tubular member 52 is further constrained by the machine member 12. However, neck 98 allows slight torsional twist without undue binding of the mechanism.

Since tubular member 52 is fixedly attached to ball nut 40 through sleeve 56, rotation of the ball nut is also prevented.

An air breather 116 is mounted in a port 118 in casing 44 to allow entrance and exit of air between housing wall 34 and piston 94. Breather 116 is fitted with a filter element (not shown) to prevent the entrance of contaminants.

The housing cavity 32 in which the portion 28 of the ball screw 30 is disposed has a large diameter cylindrical wall 120, a small diameter cylindrical wall 122, and a radial shoulder 124 between the two cylindrical walls.

The ball screw portion 28 is surrounded and held against axial shift by the twin bearings 36 and 38. Bearings 36 and 38 are held in an annular bearing cage 126 by a clamp ring 128 which is bolted to one end of the bearing cage and clamps the outer bearing races 130 against a shoulder 132 of the bearing cage at the opposite end thereof.

A bearing sleeve 134 supported in the large diameter cylindrical wall 120 of cavity 32 is clamped against shoulder 124 by compression sleeve 136, and receives the bearing cage 126. The compression sleeve 136 is clamped to housing 14 by bolts 138. The length of the bearing sleeve 134 is less than the overall, combined length of the bearing cage 126 and clamp ring 128. The thickness of the bearing sleeve 134 is such that its inner wall is disposed radially inwardly of cavity wall 122.

A heavy Belleville spring set 140 and hardened washer 142 are received and supported in the small diameter wall 122 of cavity 32. One end of the Belleville spring set 140 bears against a radial cavity wall 144 and the other end presses the washer 142 against shoulder 146 of the bearing sleeve 134.

A second set 148 of lighter Belleville springs is received and supported in the compression sleeve 136, being compressed between the clamp ring 128 of bearing cage 126 and a radial wall 150 of the compression sleeve. The spring set 148 presses the shoulder 152 of bearing cage 126 against hardened washer 142. Spring set 148 does not bear against bearing sleeve 134 because the length of bearing sleeve 134 is less than the overall, combined length of the bearing cage 126 and clamp ring 128.

The inner races of twin bearings 36 and 38 are secured against shoulder 156 of ball screw 30 by a spacer sleeve 158, the inner race of an outboard bearing 160, and a nut 162 threaded on the end of ball screw 30. Outboard bearing 160 is slidably received in an extension of compression sleeve 136.

Under normal driven rotation of the ball screw 30 when the machine member 12 does not encounter excessive resistance to movement, the bearing cage 126 is restrained from linear motion by being shouldered against washer 142 with the pressure of spring set 148 and occupies the operative position shown in FIG. 1.

If, however, the movable machine member 12 should encounter excessive resistance to movement in the direction of arrow 163, the spring pressure of spring set 148 will be overcome and shoulder 152 of bearing cage 126 will separate from contact with washer 142 and the ball screw will shift axially in a direction opposite arrow 163, thus allowing the moving member 12 to stop while rotation of the ball screw continues momentarily. In this case, the pressure of spring set 140 does not assist because it is blocked by the contact of washer 142 with shoulder 146 of bearing sleeve 134.

Similarly, if movable machine member 12 should encounter excessive resistance to movement in the direction of arrow 165, the pressure of spring set 140 will be overcome and bearing cage 126, by pressure against washer 142, will cause washer 142 to separate from contact with shoulder 146 of bearing sleeve 134 and ball screw to shift axially in a direction opposite to arrow 165, allowing the machine member 12 to stop while rotation of the ball screw continues momentarily. In this case, the pressure of spring set 148 assists the translation of the ball screw.

The compressed spring force of spring set 148 should preferably be one half the compressed spring force of spring set 140 so that the amount of excessive resistance required to overcome the bearing cage 126 restraints in one direction is the same as that required in the other direction. This invention accomplishes that task without the requirement that two members (sleeve 134 and cage 126) be exactly the same length, a condition difficult to achieve to the precise degree required of precision machine tools and is, therefore, an improvement over my U.S. Pat. No. 4,466,511.

A cover plate 164 is attached to housing 14 to provide a chamber 166 enclosing the belt sheave drive. Brake spacer block 168 is bolted to cover plate 164 inside chamber 166. Extension legs 170 and 172 of spacer block 168 are bolted to cover plate 164. Dowels 174 and 176 extend through and are fixed in spacer block 168. Their ends extend beyond both sides of spacer block 168. Ends 178 and 180 slidably receive a gland extension 182 of cylinder 184 of piston-cylinder assembly 185. Piston 186 reciprocates in cylinder 184 and has a piston rod 188. Ends 190 and 192 of dowels 174 and 176 slidably receive a flanged end 194 of piston rod 188.

Gland extension 182 of cylinder 184 is slidably received through an opening 196 in cover plate 164 between the extension legs 170 and 172 of spacer block 168. The end face of gland extension 182 has a brake facing 198 attached of suitable friction material.

Piston rod flange 194 also has a similar brake facing 200 attached.

An air port 202 is provided to admit compressed air into the chamber at the rod end of cylinder 184, which causes the cylinder gland brake facing 198 and the piston flange brake facing 200 to press against the faces 204 and 206 of brake spacer block 168 with the full force exerted by air pressure in the chamber of cylinder 184.

The brake faces 198 and 200 have portions 208 and 210 which extend beyond the brake spacer block 168 and embrace the opposite faces 212 and 214 of sheave 26. The width of sheave 26 is less than the distance between faces 204 and 206 of spacer block 168 against which the brake facings 198 and 200 press, so that there is a small clearance between the portions 208 and 210 of the brake facings and the sheave.

Since sheave 26 is fixedly attached to the end of the ball screw 30, axial movement of the ball screw will also cause axial movement of the sheave 26. Excessive resistance to motion of machine member 12 in the direction of arrow 163 will cause the ball screw to move axially in the opposite direction and face 212 of sheave 26 will engage portion 208 of brake facing 198. Continued axial movement of the ball screw 30 will cause sheave face 212 to move brake facing 198 away from the face 204 of spacer block 168. Air trapped in cylinder 184 is compressed by relative movement of piston 186 and cylinder 184. The air pressure, and hence the braking effort of brake face 198 increases rapidly, bringing the ball screw 30 to a quick stop. Piston 186, through piston rod 188 and brake flange 194, allows compliance of brake face 200 to the translating movement of sheave 26 during the braked stop. Engagement of dowel extensions 190, 192 with brake flange 194 prevents rotation of brake face 200.

Similarly, excessive resistance to motion in the direction of arrow 165 will cause the ball screw to move axially in the opposite direction and face 214 of sheave 26 will engage portion 210 of brake face 200. Continued translation of the ball screw 30 will cause sheave face 214 to move brake facing 200 away from face 206 of spacer block 168 and the yielding pressure of air in cylinder 184 immediately acts upon the sheave face 214, braking the sheave 26, and bringing the ball screw 30 to a quick stop. Cylinder 184, through its gland extension 182, allows compliance of brake face 198 to the translating movement of sheave 26 during the braked stop. Engagement of dowel extensions 178, 180 with cylinder gland 182 prevents rotation of brake face 198.

Proximity switches 216 and 218 extend through the bearing sleeve 134 to detect the movement of the groove edges 220 and 222 of bearing cage 126 and provide an electrical signal to disconnect power to the servo motor 20 when the ball screw 30 moves axially.

Referring now to FIG. 2, proximity switch 224 detects the lateral part 64 of nut 40 as it nears the stop position in which end 104 of the ball nut contacts face 105 in housing 14 and slows the nut translation to aid ultra precision switch 226 to trigger at a precise nut location, resetting all numerical counters to zero at a given position of the moving machine member 12. These switches 224 and 226 are in the closed cavity 78 and thereby protected from external contamination.

As used, this invention provides several barriers to contamination of the ball screw 30 and ball nut 40.

First, both the ball screw 30 and ball nut 40 are enclosed in the solid metal encasement of the interior of the tubular member 52.

Second, contaminant cannot reach the ball screw 30 and nut 40, nor the tubular member 52, because of the piston seal 96.

Third, contaminant is prevented from entering the casing chamber 51 by the dirt wiper 88 and seal 90. Chamber 51 may be pressurized against contaminant entry by admission of air at port 102.

Fourth, the entire ball screw drive is external to the machine frame 16, which contains the most hostile environment.

Fifth, the design permits the use of commercially-available, highly-developed round cylinder rod dirt excluders 88, at the main entrance to the hostile environment.

The linear scale encoded rod 62 and reader 68 are protected by enclosure within the closed cavity 78 and the totally enclosed sheath 74. They are also protected by their remote location from the hostile machining environment.

Machine stop faces 105 and 108 are also protected by the piston seal 96, the rod seal 90 and rod dirt excluder 88, and are totally encased within casing 44.

Position sensing switches 224 and 226 are also totally enclosed in cavity 78.

TEMPERATURE COMPENSATION

In the operation of the numerically-controlled machine, a command is issued to position and hold at a given location of encoded rod 62. To reach this position, the servo motor 20 by means of the sheaves and belts, causes rotation of the ball screw 30 and translation of the ball nut 40, tubular member 52, and linear encoded rod 62. Inefficiencies of the ball screw drive especially after several commanded moves will cause the ball nut and ball screw to increase in temperature. Heat will be conducted from the ball nut and ball screw into the surrounding components especially into sleeve 56 and tubular member 52.

Since the encoded rod 62 is remote from the source of the heat generated, it will receive little heat and nut extension piece 44 will remain nearly undisturbed. Ball nut 40 usually made of steel will, however, expand moving flange end 58 to the right in FIG. 1. Sleeve 56, being made of a material having a higher coefficient of thermal expansion than the nut, will have its opposite end moved even farther in the opposite direction. Tubular member 52, which is made from a material similar to that of the nut, having a low expansion rate but being of greater length, will expand toward the right. With proper selection of materials and lengths of parts 40, 56 and 52, flange end 100 of tubular member 52 will remain relatively undisturbed and machine member 12 will position itself in correct relationship to the commanded encoder rod position.

In vertical applications, wherein moving machine member 12 has considerable weight, pressurized air may be introduced through port 102 into casing chamber 51 to counterbalance the weight. Casing chamber 51 is concentric with the ball screw and hence binding does not occur as with counterbalance cylinders which are offset from the ball screw.

Perfect alignment of the moving machine member 12 with the axis of the ball screw drive is not attainable. The neck 98 of the attachment between the ball screw drive and the moving machine member 12 allows minute misalignment in axis offset, non-parallel travel, lack of parallelism in the attachment faces, rotational mismatch of guides of the ball screw drive and machine moving member 12, while maintaining high rigidity in the important axial direction for precise positioning of machine member 12.

I claim:

1. In apparatus having a movable member, a drive for said member including a screw, a nut mounted on said screw to move axially in response to rotation of said screw, a tubular member connected to said nut, said tubular member extending lengthwise of and surrounding said screw and having a closed end across one end of said screw, means connecting said closed end of said tubular member to said movable member, means including a casing defining a substantially closed chamber housing said nut, screw and tubular member, means in a wall of said casing defining an opening through which the closed end of said tubular member extends, means for sealing said opening to exclude foreign matter from said chamber, said casing having an annular wall, said tubular member having a piston slidable along said wall, and sealing means carried by said piston and contacting said wall to exclude foreign matter.

2. Structure as defined in claim 1, including a temperature-compensating member connecting said tubular member to said nut, said temperature-compensating member being made of a material having a different coefficient of thermal expansion than that of said nut and tubular member.

3. Structure as defined in claim 1, including a temperature-compensating member connecting said tubular member to said nut, said temperature-compensating member being made of a material having a higher coefficient of thermal expansion than that of said nut and tubular member.

4. In apparatus having a movable member, a drive including a rotatable screw, a nut mounted on said screw to move axially in response to rotation of said screw and operably connected to said member to move said member when said screw is rotated, power means for rotating said screw, mechanism for protecting the apparatus from damage due to excessive overloads when movement of said member is obstructed, said mechanism comprising means supporting said screw for axial movement, resilient means locating said screw axially in operative position and preventing axial movement of said screw in both directions from said operative position under ordinary operating conditions when movement of said member is no obstructed and said screw is subjected to axial loading below that which is excessive, said resilient means including a first spring means acting axially in one direction against said screw, said resilient means also including a second spring means acting in the opposite direction against said screw and in said opposite direction against a fixed abutment, said screw during rotation being caused to move in said one direction from its operative position when movement of said member in said opposite direction is obstructed to create an excessive overload, against the force of said second spring means and with assist from said first spring means, said screw during rotation being caused to move in said opposite direction from its operative position when movement in said one direction is obstructed to create an excessive overload, against the force of said first spring means but without assist from said second spring means the force of which is blocked by said fixed abutment, and brake means for stopping rotation of said screw in response to axial movement of said screw in either direction from its operative position.

5. Structure as defined in claim 4, wherein said brake means comprises braking elements on opposite sides of a part on said screw, one braking element or the other being engaged by said part on said screw when said screw moves axially from its operative position to stop said screw from rotating.

6. Structure as defined in claim 5, including yieldable brake support means for said braking element resisting with a yielding pressure movement of said braking elements when engaged by said part on said screw.

7. Structure as defined in claim 6, including abutment means for said braking elements holding them axially spaced from said part on said opposite sides thereof to provide a small clearance when said screw is in its operative position, said braking elements moving away from said abutment means when engaged by said part on said screw.

8. Structure as defined in claim 7, wherein said yieldable brake support means increases its resistance in response to movement of either braking element away from said abutment means.

9. Structure as defined in claim 8, wherein said yieldable brake means comprises a piston-cylinder assembly having a piston connected to one of said braking elements and a cylinder connected to the other with a chamber in said cylinder the volume of which decreases in response to movement of either of said braking elements away from said abutment means, and fluid under pressure in said chamber.

10. Structure as defined in claim 4, including means for deactivating said power means in response to axial movement of said screw.

11. In apparatus having a movable member, a drive for said member including a screw, a nut mounted on said screw to move axially in response to rotation of said screw, a tubular member connected to said nut, said tubular member extending lengthwise of and surrounding said screw and having a closed end across one end of said screw, means connecting said closed end of said tubular member to said movable member, means including a casing defining a substantially closed chamber housing said nut, screw and tubular member, means in a wall of said casing defining an opening through which the closed end of said tubular member extends, means for sealing said opening to exclude foreign matter from said chamber, means for controlling he axial movement of said nut including a linear encoded rod and a rod reader for said rod, said rod being operatively connected to said nut inside said casing chamber, said rod extending from said casing chamber into a sealed chamber separated from said casing chamber, said rod reader being disposed in said sealed chamber.

12. Structure as defined in claim 11, wherein said screw is numerically controlled and including switch means for resetting all numerical counters at a given position of said movable member, said switch means being housed in said sealed chamber.

13. Structure as defined in claim 4, wherein the force of said first spring means is one-half the force of said second spring means.

14. Structure as defined in claim 4, wherein stops within said casing chamber are provided to determine the limits of travel of said nut in both directions.

* * * * *